US006326457B1

(12) United States Patent
Erbes et al.

(10) Patent No.: US 6,326,457 B1
(45) Date of Patent: Dec. 4, 2001

(54) CONTINUOUS POLYAMIDE EXTRACTION PROCESS

(75) Inventors: Jörg Erbes, Ludwigshafen; Alfons Ludwig, Höxter; Gunter Pipper, Bad Dürkheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/554,214

(22) PCT Filed: Nov. 24, 1998

(86) PCT No.: PCT/EP98/07575

§ 371 Date: May 11, 2000

§ 102(e) Date: May 11, 2000

(87) PCT Pub. No.: WO99/26996

PCT Pub. Date: Jun. 3, 1999

(30) Foreign Application Priority Data

Nov. 25, 1997 (DE) .............................................. 197 52 183

(51) Int. Cl.$^7$ ......................... C08G 69/08; C08G 73/10; C08F 6/00
(52) U.S. Cl. .......................... 528/310; 528/322; 528/332; 528/480; 528/499; 528/500
(58) Field of Search ...................... 528/480, 499, 528/500, 310, 332, 322

(56) References Cited

U.S. PATENT DOCUMENTS 3,423,183  1/1969  Goetzke .................................. 23/270
3,639,659  2/1972  Nieswandt et al. ..................... 260/78
4,053,457  10/1977  Cordes et al. .......................... 260/78
4,376,680  3/1983  Horak et al. ............................ 203/89
4,816,557  3/1989  Pipper et al. ......................... 528/324

FOREIGN PATENT DOCUMENTS

| 27 32 328 | 1/1979 | (DE) . |
| 206 999 | 2/1984 | (DE) . |
| 289 471 | 5/1991 | (DE) . |
| 43 24 616 | 1/1995 | (DE) . |
| 1 279 606 | 11/1972 | (GB) . |
| 42 025 579 | 8/1970 | (JP) . |
| 4 726438 | 10/1972 | (JP) . |
| 48 002233 | 1/1973 | (JP) . |
| 5 1149 397 | 12/1976 | (JP) . |
| 5 3071 196 | 6/1978 | (JP) . |
| 60 166 324 | 8/1985 | (JP) . |
| 195 05 150 | 8/1996 | (JP) . |

*Primary Examiner*—P. Hampton-Hightower
(74) *Attorney, Agent, or Firm*—Keil & Weinkauf

(57) ABSTRACT

A process for continuous extraction of polyamide particles using a recirculating extractant in a vertical extraction column that is divided into two zones comprises treating the polyamide with an aqueous extractant comprising from 40 to 95% by weight of $\epsilon$-caprolactam in a first zone at from 100 to 140° C., and then effecting an aftertreatment with water in a second zone. The caprolactam can then be extracted in a conventional manner. The process provides for economical production of polyamide having a low dimer content.

10 Claims, 2 Drawing Sheets

CONTINUOUS POLYAMIDE EXTRACTION PROCESS

BACKGROUND OF THE INVENTION

1. Field of the Invention

The present invention relates to a process for continuous extraction of polyamides, especially nylon 6, by treating polyamide particles in a vertical extraction column with recirculating aqueous ε-caprolactam solution.

Nylon 6 (polycaprolactam) is produced by polymerization of ε-caprolactam. The polycaprolactam obtained has a caprolactam monomer and oligomer content of, for example, from 8 to 11% by weight. Left in the polycaprolactam product, these low molecular weight constituents (in the following refered to as extractables) cause undesirable effects in further processing of the polymer product and must therefore be removed. Industrially, this is accomplished by continuous or batchwise extraction with hot water (DE-A-25 01 348, DE-A-27 32 328) and by distillative removal under reduced pressure (U.S. Pat. No. 4,376,680) or in superheated steam (EP 0 284 968 B1). These processes are all carried out with an eye to recovering and reusing the extractables for reasons of environmental protection and economy. For nylon 6, these processes leave residual extractables (methanol-extractables) consisting essentially of caprolactam oligomers which are sparingly soluble in water or involatile, especially dimers and cyclic oligomers.

2. Description of the Related Art

Various apparatus has been proposed for extracting low molecular constituents from polyamides. GB 12 97 606 discloses an extraction column that is divided into at least two zones, the extractant being recirculated within each zone in countercurrent to the flow of liquid by removal at the upper end of the zone and reintroduction at the lower end of the zone. Similar apparatus is described, for example, in CZ 253 019, FR 15 18 775, DD 206 999 and DE-A-17 70 097.

It is known that caprolactam monomer acts as a solublizer for caprolactam oligomer in the extraction of nylon 6. This is why, for example according to JP-A-47 026438, the nylon 6 chips are pretreated with a solution of from 15 to 90%, preferably of from 40 to 70%, of ε-caprolactam to remove the water-solubles. In DD 289 471, the chips are treated in countercurrent at above 60° C. with from 1 to 40% of caprolactam in the wash water (the percentages are each by weight). DE-A-43 24 616 discloses a process for extracting nylon 6 to obtain products having a very low residual level of dimeric ε-caprolactam. Here, a first stage, which features an extraction with from 41 to 80% caprolactam solution at from 80 to 120° C., is followed by one or more postextraction stages, either with water at high temperature or under reduced pressure. In JP-A-48 002 233 polycaprolactam is purified by admixing the molten polymer with from 5 to 30% strength caprolactam solution and then purifying the resulting dispersion at from 80 to 120° C. in an extraction column. In JP-A-53 071 196, polyamide is initially extracted with a hot aqueous medium and then purified at from 10 to 50° C. below the melting point of the polyamide in an inert gas stream, the hot aqueous medium comprising, for example, water at from 80 to 130° C. with an ε-caprolactam content of less than 50% by weight. JP A-45 025 519 discloses a multistage extraction process wherein the polyamide chips are extracted with from 5 to 50% strength aqueous caprolactam solution at from 70 to 120° C. in the first stage and with from 0.1 to 5% strength aqueous caprolactam solution at from 70 to 120° C. in the second stage. JP-A-51 149 397 describes an extraction with an aqueous 60% strength by weight ε-caprolactam solution at from 80 to 120° C. for from 3 to 8 hours in the first stage and an extraction with caprolactam-free water, which is preferably $O_2$-free or comprises small amounts of a reducing agent, in the last stage. These processes too are preferably carried out with recovery and reuse of the extractables for reasons of environmental protection and economy. Accordingly, JP-A-60 166 324 discloses a continuous nylon 6 extractor wherein the chips are extracted with water in countercurrent by recirculating the bulk of the extraction liquid with addition of ε-caprolactam. The extractant is pumped off through an aspirator, admixed with caprolactam and returned into the apparatus via a distributor located at the same level as the aspirator. The pumped-off extract has a caprolactam content of only 13.5%, i.e., less than 20%.

In DE-A-195 05 150 the caprolactam oligomer is removed from polyamide chips by treatment with pure caprolactam as extractant at from 60 to 150° C. However, this method has the disadvantage that adherent caprolactam may lead to stickiness of the chips in subsequent operations. Moreover, at these temperatures, the chips would also dissolve in caprolactam to some extent.

Using water or water vapor as extractant for the polyamide chips it is very difficult to achieve the present-day requirement of residual extractables contents <0.5%. The extract obtained will typically be a solution having an extractables content of from 5 to 15%, similar to what is obtained using caprolactom-comprising extractants. The extract may additionally include inorganics such as titanium dioxide, silicon dioxide and manganese oxide, typically added to the polyamide for stabilization or delustering. Existing processes have in common that either the residual extractables content of the chips is too high or that the aqueous extract has to be highly concentrated in order that the caprolactam monomer and caprolactam oligomer may be recycled into the polymerization. Oligomer and inorganics may separate out during the concentrating, which also has appreciable energy requirements.

BRIEF DESCRIPTION OF THE INVENTION

It is an object of the present invention to provide a process for removing caprolactam oligomer from polyamide to obtain a polyamide having a very low residual extractables or dimer content without generating large volumes of extractant having a low extractables content.

We have found that this object is achieved according to the invention by a process for continuous extraction of polyamide particles, especially polyamide chips or flakes, in an essentially vertical extraction column using an aqueous extractant, which comprises using an extraction column that is divided into two zones, treating the polyamide with a recirculating aqueous extractant comprising from 40 to 95% by weight of ε-caprolactam in a first zone, and then effecting a countercurrent aftertreatment with water in a second zone.

The novel process has the advantage that the level of caprolactam oligomer in the polyamide is reduced in a simple manner, and the extract obtained as the extractant absorbs the oligomer requires little if any workup to be returnable to the polymerization reactor. The extraction additionally provides the desired low level of oligomer appreciably faster than is the case in existing processes. The further extraction of the caprolactam can then be effected in a conventional manner. This provides in an economical manner a polyamide having a low residual extractables content of less than 0.5%, especially less than 0.05% of dimer.

It has also been found that the extract obtained is highly concentrated and has a low water content and may, if desired, be returned directly back into the caprolactam polymerization without further evaporation of water.

DETAILED DESCRIPTION OF THE INVENTION

Suitable polyamides are polycaprolactam or copolyamides of caprolactam and further polyamide-forming starting materials, the caprolactam-derived portion being preferably not less than 20% by weight, especially not less than 25% by weight. Preferred polyamide-forming starting materials are diamines and dicarboxylic acids suitable for forming polyamides. Suitable dicarboxylic acids are, for example, alkanedicarboxylic acid having from 6 to 12 carbon atoms, especially from 6 to 10 carbon atoms, and also terephthalic acid and isophthalic acid. Suitable diamines are, for example, alkanediamines having from 4 to 12, especially from 6 to 8, carbon atoms, also m-xylylenediamine, bis(4-aminophenyl)methane, 2,2-bis(4-aminophenyl)propane or bis(4-aminocyclohexyl)methane. Dicarboxylic acids and diamines can each be used in any desired combinations, but advantageously in an equivalent ratio. Of particular industrial significance are polycaprolactam and polyamides based on caprolactam, hexamethylenediamine and also adipic acid, isophthalic acid and/or terephthalic acid.

Polyamide chips typically comprise from 2 to 15% by weight of caprolactam monomer and caprolactam oligomer, especially from 8 to 12% by weight of caprolactam monomer and caprolactam oligomer. Polyamide chips generally have a size within the range from 1.5×1.5 mm to 4×4 mm.

The polyamides used may additionally include customary additives such as delusterants, e.g. titanium dioxide, nucleating agents, e.g., magnesium silicate, stabilizers, e.g., copper(I) halides and alkali metal halides, antioxidants and reinforcing agents in customary amounts. The additives are typically added before, during or after the polymerization and before the pelletizing step.

The polyamide is introduced into a top-charging extraction column which is essentially vertical and preferably tubular. The polyamide chips obtained after the polymerization and subsequent pelletizing stage can be fed to the continuous extraction column via a transportation water circuit, for example. The chips are separated from the transporting water by a separating means (sieve) and fall into the extractor bed at a temperature of from 20 to 90° C., for example. The chips pass downwardly through the extraction column under gravity and are discharged at the low end of the extraction column via a suitable apparatus, for example a screw, which is preferably deep-drawn. Cold water is continuously fed in at the base of the extraction column and passes upwardly through the extraction column in countercurrent to the chips.

The extractant is recirculated in the upper part of the extraction column, the first zone, which constitutes from 60 to 99%, preferably from 85 to 99%, of the total volume of the extraction column and whose tube diameter is from about 2 to 10 times that of the second zone. The recirculating extractant is preferably withdrawn in the top region and reintroduced into the column in the bottom region of the first zone via a distributing means (preferably an annular nozzle or perforated plate) at a uniform rate. However, it is also possible to proceed conversely, i.e., the extractant is withdrawn in the bottom region and reintroduced in the top region. The amount of extractant recirculated within the first zone is chosen so that, on the one hand, a temperature and concentration equilibration is ensured within the head and an intensive mass transfer takes place at the phase interface of the polyamide particles. On the other hand, the flow rate of the extractant must not exceed the swirling point of the particles. Accordingly, the velocity is generally set within the range from 2 to 20 m/h, preferably within the range from 3 to 15 m/h.

In an alternative embodiment, the fresh caprolactam is fed directly via a first annular nozzle/perforated plate distributing means in the bottom region of the first zone. The extractant is recirculated above the first distributing means, the region of recirculation generally accounting for from about 35 to 65% of the length of the first zone. The extractant is reintroduced above the first distributing means. Preferably, the extractant is withdrawn in the top region of the first zone and reintroduced roughly in the middle of the first zone. The feed is preferably effected by a second distributing means, which is generally an annular nozzle or perforated plate. Alternatively, fresh caprolactam can be additionally introduced into the region of recirculation of the first zone.

The extractor temperature in the first zone is generally within the range from 95 to 140° C., preferably within the range from 115 to 130° C. It is set by a heat exchanger disposed within the extractant circuit outside the extraction column, so that the entering polyamide is heated to the desired temperature. The extractant has a caprolactam concentration within the range from 40 to 95% by weight, preferably within the range from 75 to 95% by weight. It is obtained by adding liquid caprolactam at from 80 to 100° C. into the top circuit, extractant being removed in the first zone at the rate at which water is added at the base of the column and caprolactam is added in the top circuit. Sufficient fresh caprolactam is added to maintain the caprolactam concentration in the first zone within the specified range. The high caprolactam concentration speeds up the removal of caprolactam oligomer, especially caprolactam dimer, from the polyamide, the better equilibrium position making it possible to achieve a lower oligomer content in the polyamide than is achievable upon extraction with pure water.

The second zone of the extraction column is preferably a slim unheated tube. The cross-sectional area is so chosen as to make it possible to maintain a comparatively high flow rate of from 0.2 to 6.0 m/h, preferably of from 1 to 3 m/h, for the ascending liquid phase, although the amount of water supplied at the base of the extractor is comparatively small to obtain the desired high caprolactam concentrations in the top circuit. More particularly, the ratio of the cross-sectional areas of the two extraction zones is so chosen as to prevent any sinking of the highly concentrated extractant, which has a higher specific gravity, from the first zone of the extractor into the second zone beneath. The second zone, owing to the lower temperature and the short residence time, features further extraction of the oligomer only to a minor extent. The second zone serves essentially to remove superficially adhering caprolactam in order that sticking of the particles in the course of intermediary storage or in the subsequent operations may be avoided. The residence time in the second zone has to be sufficient to ensure adequate washing of the chips for the subsequent stages (stickiness). The lower temperature of the second zone compared with the first zone additionally counteracts any sinking of the heavier extractant from the first zone.

The residence time of the polyamide in the first zone is generally within the range from 2 to 10 hours, preferably within the range from 4 to 6 hours. The residence time in the second zone beneath is generally within the range from 2 to 60 minutes, preferably within the range from 5 to 30 minutes. In general, from 60 to 99% of the extraction time is accounted for by the first zone.

The extractor is preferably discharged via a single discharge screw, which discharges the polyamide continuously without loss of extractant and transfers it into a transportation water circuit. The discharge screw provides for a very uniform and attritionless discharge and prevents bridging of particles in the discharge region. The discharged amount of polyamide and hence the polyamide level in the extraction column can be controlled via the speed of the single screw. The addition of small quantities of water to the transportation water circuit, which enter the extractor through the screw, serves to create, in the screw, a flow of liquid which is countercurrent to the exiting polyamide and at the same time ensures an upward flow of the liquid phase in the base region of the extractor, preventing any backmixing.

The polyamide discharged from the extraction column has a residual extractables content of from 4 to 15% by weight. This residual extractables content consists essentially of caprolactam monomer, whereas the oligomers of caprolactam and especially the dimer have been appreciably removed by the process of the present invention. Dimer concentrations <0.1% by weight, preferably <0.05% by weight, are achieved in the polyamide.

The highly concentrated extract removed from the first zone can, if necessary, be initially further concentrated in a single-stage or multi-stage concentrator by removal of water. If desired, however, it can also be returned into the polymerization stage directly without prior further water removal or after addition of fresh caprolactam.

The better equilibrium position as compared with the prior art means that a smaller extractant/polyamide ratio of 1:1 to 1:2 is needed, which further reduces the amount of water to be evaporated during the workup of the wash water. Moreover, the high concentration of caprolactam in the extract means an end to the troublesome precipitation of caprolactam oligomers during the further processing of the extract.

The further removal from the extracted polyamide of low molecular weight constituents (oligomers, caprolactam, etc.) still present therein can be effected using various inexpensive processes which are known to one skilled in the art, but which do not lead to the desired low residual extractables contents without the prior removal of oligomer. The removal takes place in particular in the melt under reduced pressure or at atmospheric pressure, and steam can be introduced, if desired (melt delactamization in thin-film apparatus or in a devolatilizing extruder, see DE-A-39 32 793 for example). The low molecular weight constituents can also be removed by treating the extracted polyamide chips with a hot inert gas, especially with superheated steam, under reduced pressure or at atmospheric pressure.

BRIEF DESCRIPTION OF THE DRAWING

FIG. 1 schematically depicts by way of example an extraction column for the process of the present invention. Said extraction column 1 comprises a first (upper) tubular zone 2 and a second (lower) tubular zone 3, which are connected to one another via a funnel-shaped section 14. The ratio of the length of said first zone 2 to that of said second zone 3 is generally within the range from 1:5 to 5:1, preferably within the range from 1:2 to 2:1. The ratio of the tube diameter of said first zone 2 to that of said second zone 3 is generally within the range from 8:1 to 2:1, preferably within the range from 6:1 to 3:1.

Figure 1:
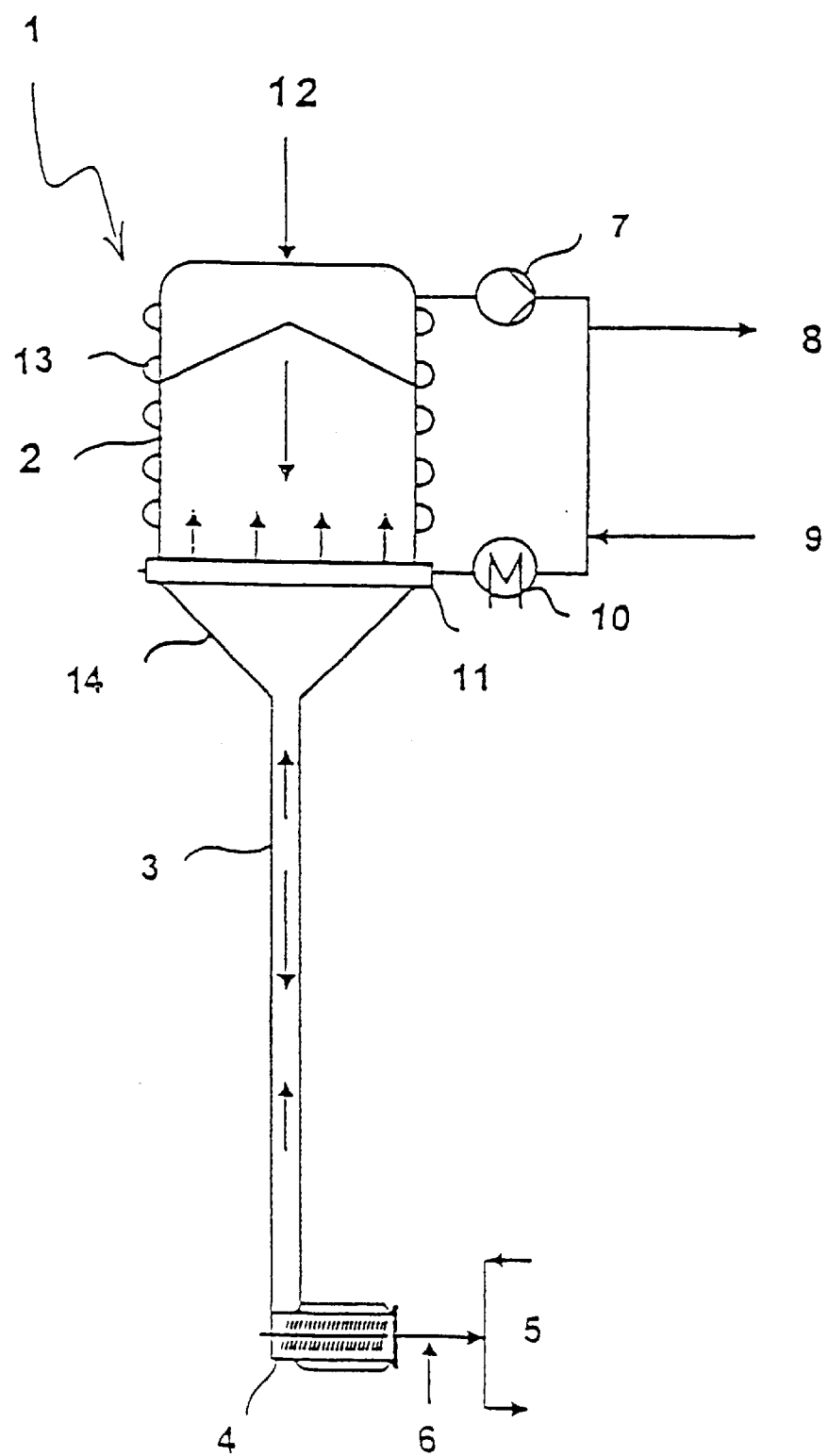
FIG. 1 shows a schematic of a first embodiment of an extraction column for the process of the present invention.

The polyamide chips 12 are introduced into said first zone 2 from the top, pass through it downwardly and then through said tubular second zone 3 and are then discharged via the discharge screw 4 into the transportation water circuit 5. Fresh water 6 is fed by said discharge screw 4 into said extraction column 1 as required. On passing through said extraction column 1, the water initially picks up caprolactam in said second zone 3 and then mixes in the bottom part of said first zone 2 with the extractant which is circulated therein. This is removed in the top part of said first zone 2 by a pump 7, passed through a heat exchanger 10 which maintains the temperature within the desired range and reintroduced through a perforated plate 11 in the bottom region of said first zone 2. Some of the extractant is removed at 8 and sufficient fresh caprolactam is supplied via 9 and sufficient water via 6 so that the caprolactam concentration in the extractant is maintained within the desired range. Said upper zone 2 can, if desired, be additionally heated by jacketed tubes 13, whereas said second zone 3 is not externally heated, but may be cooled, if desired.

Figure 2:
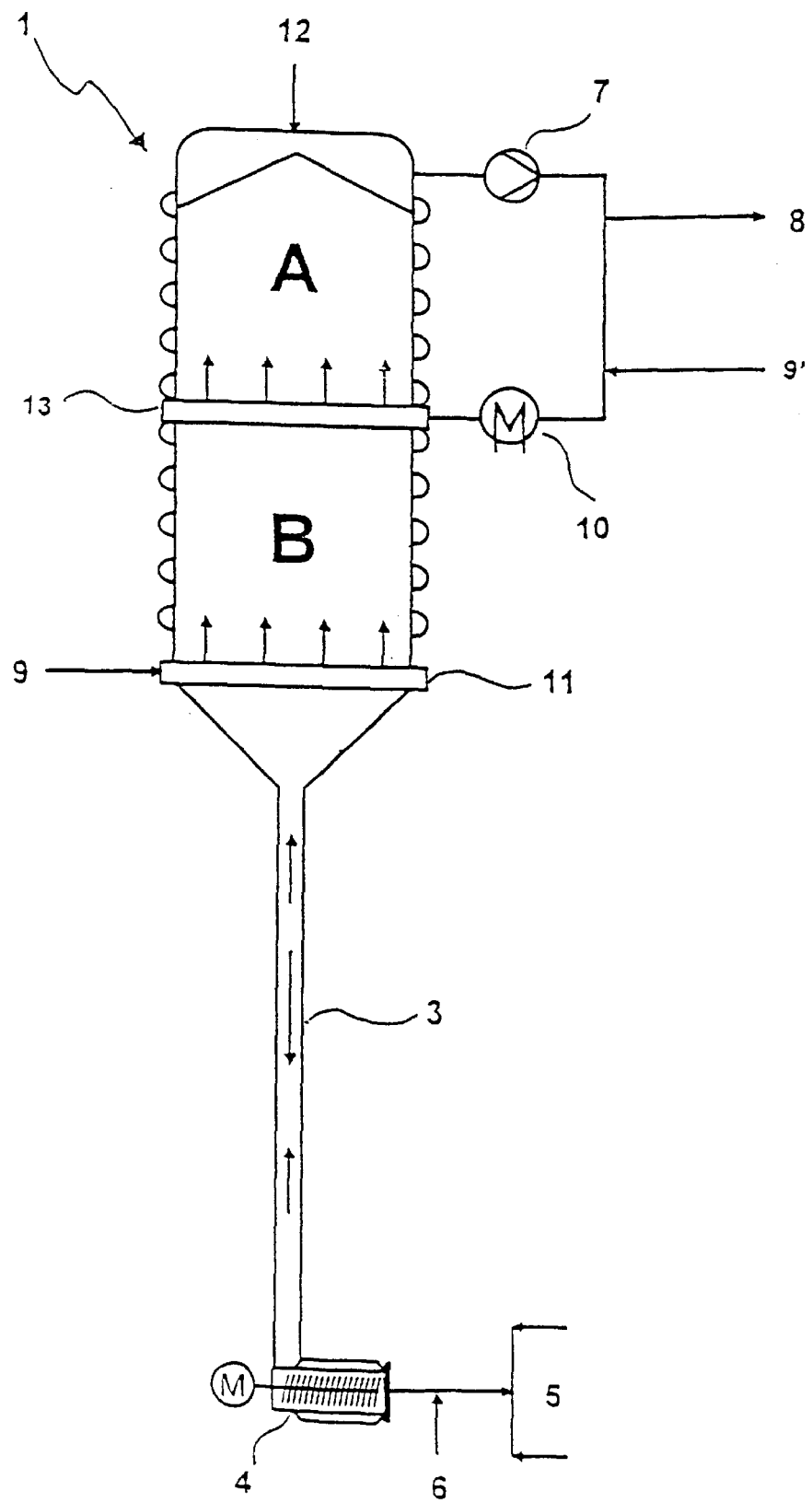
FIG. 2 shows a schematic of a further embodiment of an extraction column for the process of the present invention.

A further embodiment of an extraction column useful for the process Qf the present invention is shown in FIG. 2. Said extraction column 1 comprises a first (upper) zone 2 and a second (lower) zone 3. The ratio of the length of said first zone 2 to that of said second zone 3 is generally within the range from 1:5 to 5:1, preferably within the range from 1:2 to 2:1. The ratio of the tube diameters is as specified for FIG. 1. The regions A and B extend over roughly the same length.

The extraction proceeds in principle as described for FIG. 1. The only difference is that the extractant circuit includes only the top part A of said first zone 2, i.e., the extractant is withdrawn in the top region of said first zone 2 and reintroduced into its middle region by a second annular nozzle 13. Fresh caprolactam is added at 9 via a first annular nozzle 11, which is located in the bottom region of said first zone 2. Some of the caprolactam can also be introduced directly into the top circuit at 9'. This way, the caprolactam gradient in the extractor can be controlled. The polyamide chips 12 are thus initially treated in said top region A with a recirculating extractant and then in said bottom region B with caprolactam in countercurrent. This provides for a polyamide having a particularly low dimer content (<0.05%).

The Examples which follow illustrate the process of the present invention.

EXAMPLES

The unextracted nylon 6 chips used have a caprolactam monomer content of 9.0% and a dimer content of 0.63%. The individual chip is from 12.5 to 14.5 mg in weight on average and has a cylindrical shape measuring about 3×2 mm.

Inventive Example 1

The extraction column used is as illustrated in FIG. 1 and has a first zone 2 of 4400 mm in length and 210 mm in diameter. 20 kg/h of unextracted nylon 6 chips 12 are introduced continuously. The base of said extraction column 1 is continuously supplied with 4.2 kg/h of fresh water 6 at 20° C. The length of the tubular second zone 3 is 4000 mm coupled with a diameter of 50 mm. 0.4 m³/h of extractant is removed in said first zone 2 with a recirculating pump 7 and, after passage through a heat exchanger 10, reintroduced into said zone 2 via a perforated plate 11. The temperature is set to 125° C. via said heat exchanger. 17 kg/h of liquid caprolactam 9 are metered into the circuit upstream of said heat exchanger to maintain a caprolactam concentration of 80% in said zone 2. The chips discharged by the discharge screw 4 have a residual extractables content of 14% and, a dimer content of 0.11%. 200 g of these chips are treated batchwise with 1000 g/h of superheated steam at 180° C. under atmospheric pressure over a period of 24 hours. The resulting nylon 6 chips have a residual extractables content of 0.3% and a diner content of 0.05%.

Comparative Example 1

200 g of unextracted nylon 6 chips are treated batchwise with 1000 g/h of superheated steam at 180° C. under atmospheric pressure over a period of 24 hours. This leaves an extractables content of 0.9% and a dimer content of 0.4%.

Inventive Example 2

200 g of chips pretreated as under Inventive Example 1 are treated batchwise with 70 g/h of superheated steam at 180° C. and a pressure of 70 mbar over a period of 24 hours, leaving a residual extractables content of 0.2% and a dimer content of 0.04%.

Comparative Example 2

200 g of unextracted nylon 6 chips are treated as described under Inventive Example 2, affording a residual extractables content of 0.9% and a dimer content of 0.4%.

Inventive Example 3

Chips which have been pretreated as under Inventive Example 1 are treated via a devolatilizing extruder (ZSK 25, from Werner & Pfleiderer) having two devolatilizing domes and a graduated vacuum (120 mbar, <10 mbar, from 280 to 290° C.). The throughput is 5 kg/h. The polyamide chips obtained have a residual extractables content of 0.5% and a dimer content of 0.03%.

Comparative Example 3

The extruder treatment of Inventive Example 3 is repeated with unextracted nylon 6 chips, affording a residual extractables content of 1.9% and a dimer content of 0.55%.

Inventive Example 4

Chips which have been pretreated as under Inventive Example 1 are treated in a devolatilizing extruder (ZSK 25) featuring two-stage flash devolatilization at atmospheric pressure and simultaneous introduction of steam. The melt temperatures in the devolatilizing zones range from 280 to 300° C. The throughput is 5 kg/h. The polyamide has a residual extractables content of 0.6% and a dimer content of 0.05%.

Comparative Example 4

Inventive Example 4 is repeated with unextracted nylon chips, affording a residual extractables content of 2.1% and a dimer content of 0.55%.

The Inventive and Comparative Examples show that the process of the present invention reduces the residual extractables content and especially the dimer content of nylon 6 chips significantly upon extraction.

We claim:

1. A process for continuous extraction of polyamide particles in an essentially linear extraction column using an aqueous extractant, which comprises using an extraction column that is divided into two zones, treating the polyamide with a recirculating aqueous extractant comprising from 40 to 95% by weight of $\epsilon$-caprolactam in a first zone, wherein the temperature in the first zone is within the range from 95 to 140° C., and then effecting a countercurrent aftertreatment with cold water at a flow rate of from 0.2 to 6.0 m/h and a residence time of the polyamide within the range from 2 to 60 minutes in a second zone, wherein the ratio of the tube diameter of the first zone to that of the second zone is within the range from 8:1 to 2:1.

2. A process as claimed in claim 1, wherein the extractant is recirculated in the first zone by removing it in the top region and feeding it into the bottom region.

3. A process as claimed in claim 1, wherein the extractant is recirculated within a subregion of the first zone.

4. A process as claimed in claim 3, wherein the extractant is recirculated by removing it from the top region and reintroducing it in the middle region.

5. A process as claimed in claim 1, wherein a sufficient amount of the extract recirculating in the first zone is removed and replaced by fresh caprolactam and water at the base of the extraction column to establish the caprolactam content of from 40 to 95% by weight in the first zone.

6. A process as claimed in claim 5, wherein the caprolactam is introduced into the recirculating stream and/or directly into the bottom region of the first zone.

7. A process as claimed in claim 1, wherein the weight ratio of extraction solution to the polyamide in the first zone is within the range from 1:1 to 1:2.

8. An essentially vertical extraction column for performing the process of claim 1, comprising:

a first zone (2) having means for feeding and removing an extractant, a second zone (3) connected to the first zone (2), the ratio of the length of the first zone (2) to that of the second zone (3) being within the range from 1:5 to 5:1, and the ratio of the tub diameters of the first zone (2) to those of the second zone (3) being within the range from 8:1 to 2:1.

9. An extraction column as claimed in claim 8, wherein the first zone (2) is connected to the second zone (3) via a funnel-shaped section (14).

10. An extraction column as claimed in claim 8, wherein the means for feeding the extractant comprise an annular nozzle or perforated plate (11).

* * * * *

UNITED STATES PATENT AND TRADEMARK OFFICE
CERTIFICATE OF CORRECTION

PATENT NO.   : 6,326,457 B1
DATED        : December 4, 2001
INVENTOR(S)  : Erbes et al.

It is certified that error appears in the above-identified patent and that said Letters Patent is hereby corrected as shown below:

<u>Column 8,</u>
Line 7, "linear" should be -- vertical --.

Signed and Sealed this

Ninth Day of July, 2002

Attest:

Attesting Officer

JAMES E. ROGAN
Director of the United States Patent and Trademark Office